United States Patent
Kim et al.

(10) Patent No.: US 9,363,809 B2
(45) Date of Patent: Jun. 7, 2016

(54) METHOD AND WIRELESS DEVICE FOR MONITORING CONTROL CHANNEL

(71) Applicant: LG ELECTRONICS INC., Seoul (KR)

(72) Inventors: Hak Seong Kim, Anyang-si (KR); Han Byul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 14/360,211

(22) PCT Filed: Nov. 23, 2012

(86) PCT No.: PCT/KR2012/009993
§ 371 (c)(1),
(2) Date: May 22, 2014

(87) PCT Pub. No.: WO2013/077677
PCT Pub. Date: May 30, 2013

(65) Prior Publication Data
US 2014/0328305 A1    Nov. 6, 2014

Related U.S. Application Data

(60) Provisional application No. 61/563,533, filed on Nov. 23, 2011, provisional application No. 61/676,344, filed on Jul. 27, 2012, provisional application No. 61/679,082, filed on Aug. 3, 2012, provisional application No. 61/678,629, filed on Aug. 1, 2012.

(51) Int. Cl.
| | |
|---|---|
| *H04W 4/00* | (2009.01) |
| *H04W 72/04* | (2009.01) |
| *H04L 5/00* | (2006.01) |
| *H04L 1/00* | (2006.01) |
| *H04W 72/08* | (2009.01) |
| *H04L 27/26* | (2006.01) |
| *H04L 1/18* | (2006.01) |

(52) U.S. Cl.
CPC ........... *H04W 72/042* (2013.01); *H04L 1/0072* (2013.01); *H04L 5/001* (2013.01); *H04L 5/0053* (2013.01); *H04L 27/261* (2013.01); *H04W 72/082* (2013.01); *H04L 1/1829* (2013.01)

(58) Field of Classification Search
CPC .......................... H04W 72/046; H04L 5/0046
USPC ..................................... 370/241–339
See application file for complete search history.

(56) References Cited

U.S. PATENT DOCUMENTS

| 2013/0039284 A1* | 2/2013 | Marinier | H04L 5/001 370/329 |
| 2013/0100901 A1* | 4/2013 | Shan | H04L 5/0048 370/329 |
| 2014/0126517 A1* | 5/2014 | Choi | H04L 5/001 370/29 |

FOREIGN PATENT DOCUMENTS

| KR | 10-2011-0001936 | 1/2011 |
| KR | 10-2011-0031888 | 3/2011 |
| KR | 10-2011-0094161 | 8/2011 |

OTHER PUBLICATIONS

Apple Inc., "On the Structure and Usage Scenarios of ePDCCH," 3GPP TSG RAN WG1 Meeting #67, R1-114300, Nov. 2011, 9 pages.
PCT International Application No. PCT/KR2012/009993, Written Opinion of the International Searching Authority dated Feb. 28, 2013, 1 page.

\* cited by examiner

*Primary Examiner* — Iqbal Zaidi
(74) *Attorney, Agent, or Firm* — Lee Hong Degerman Kang & Waimey; Jonathan Kang; Jeffrey Lotspeich

(57) ABSTRACT

Provided are a method for monitoring a control channel and a wireless device using same. A wireless device decodes downlink control information on a downlink control channel on L number of resource units in an aggregation level L (L>1). The downlink control information comprises a plurality of modulation symbols, and permutations of the plurality of modulation symbols are mapped to the L number of resource units.

8 Claims, 16 Drawing Sheets

FIG. 12

|   |   |
|---|---|
| 7 | 15 |
| 6 | 14 |
| 5 | 13 |
| 4 | 12 |

RB #2

|   |   |
|---|---|
| 3 | 11 |
| 2 | 10 |
| 1 | 9 |
| 0 | 8 |

RB #1

METHOD AND WIRELESS DEVICE FOR MONITORING CONTROL CHANNEL

CROSS-REFERENCE TO RELATED APPLICATIONS

This application is the National Stage filing under 35 U.S.C. 371 of International Application No. PCT/KR2012/009993, filed on Nov. 23, 2012, which claims the benefit of U.S. Provisional Application Ser. No. 61/563,533, filed on Nov. 23, 2011, 61/676,344, filed on Jul. 27, 2012, 61/679,082, filed on Aug. 3, 2012 and 61/678,629, filed on Aug. 1, 2012, the contents of which are all hereby incorporated by reference herein in their entirety.

BACKGROUND OF THE INVENTION

1. Field of the Invention

The present invention relates to wireless communications, and more particularly, to a method for monitoring a control channel in a wireless communication system, and a wireless device using the method.

2. Related Art

Long term evolution (LTE) based on $3^{rd}$ generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To cope with increasing data traffic, various techniques are introduced to increase transmission capacity of a mobile communication system. For example, a multiple input multiple output (MIMO) technique using multiple antennas, a carrier aggregation technique supporting multiple cells, etc., are introduced.

In 3GPP LTE/LTE-A, blind decoding is used to detect a PDCCH. In the blind decoding, a desired identifier is demasked from a cyclic redundancy check (CRC) of the PDCCH to be received, and a CRC error is checked to confirm whether the PDCCH is a control channel of a corresponding user equipment.

A blind decoding error implies a reception error of the downlink control channel, which may have a significant effect on communication between a base station and the user equipment.

SUMMARY OF THE INVENTION

The present invention provides a method of monitoring a downlink control channel to decrease a blind decoding error, and a wireless device using the method.

The present invention also provides a method of transmitting downlink control information to decrease a blind decoding error, and a base station using the method.

In an aspect, a method for monitoring a control channel in a wireless communication system is provided. The method includes decoding, by a wireless device, downlink control information through a downlink control channel on L resource units at an aggregation level L, where L>1. The downlink control information includes a plurality of modulation symbols, and the plurality of modulation symbols are permutated and mapped to the L resource units.

Each of the L resource units may include Kq basic units, where Kq is the number of basic units corresponding to a resource unit q, where q=0, . . . , L−1.

The resource unit may be an enhanced control channel element (ECCE), and the basic unit may be a resource element (RE).

The plurality of modulation symbols may be mapped to the L resource units on the basis of a modulo-L.

In another aspect, a wireless device in a wireless communication system is provided. The wireless device includes a radio frequency (RF) unit configured to transmit and receive a radio signal, and a processor operatively coupled to the RF unit and configured to decode downlink control information through a downlink control channel on L resource units at an aggregation level L, where L>1. The downlink control information includes a plurality of modulation symbols, and the plurality of modulation symbols are permutated and mapped to the L resource units.

In still another aspect, a method of transmitting downlink control information in a wireless communication system is provided. The method includes mapping, by a base station, the downlink control information on L resource units at an aggregation level L, where L>1, transmitting, by the base station, the mapped downlink control information to a wireless device. The downlink control information includes a plurality of modulation symbols, and the plurality of modulation symbols are permutated and mapped to the L resource units.

Since blind decoding is prevented from being successfully performed at a wrong aggregation level, reception reliability of downlink control information can be increased.

BRIEF DESCRIPTION OF THE DRAWINGS

FIG. 12 shows another example of CCE-to-PRB mapping.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
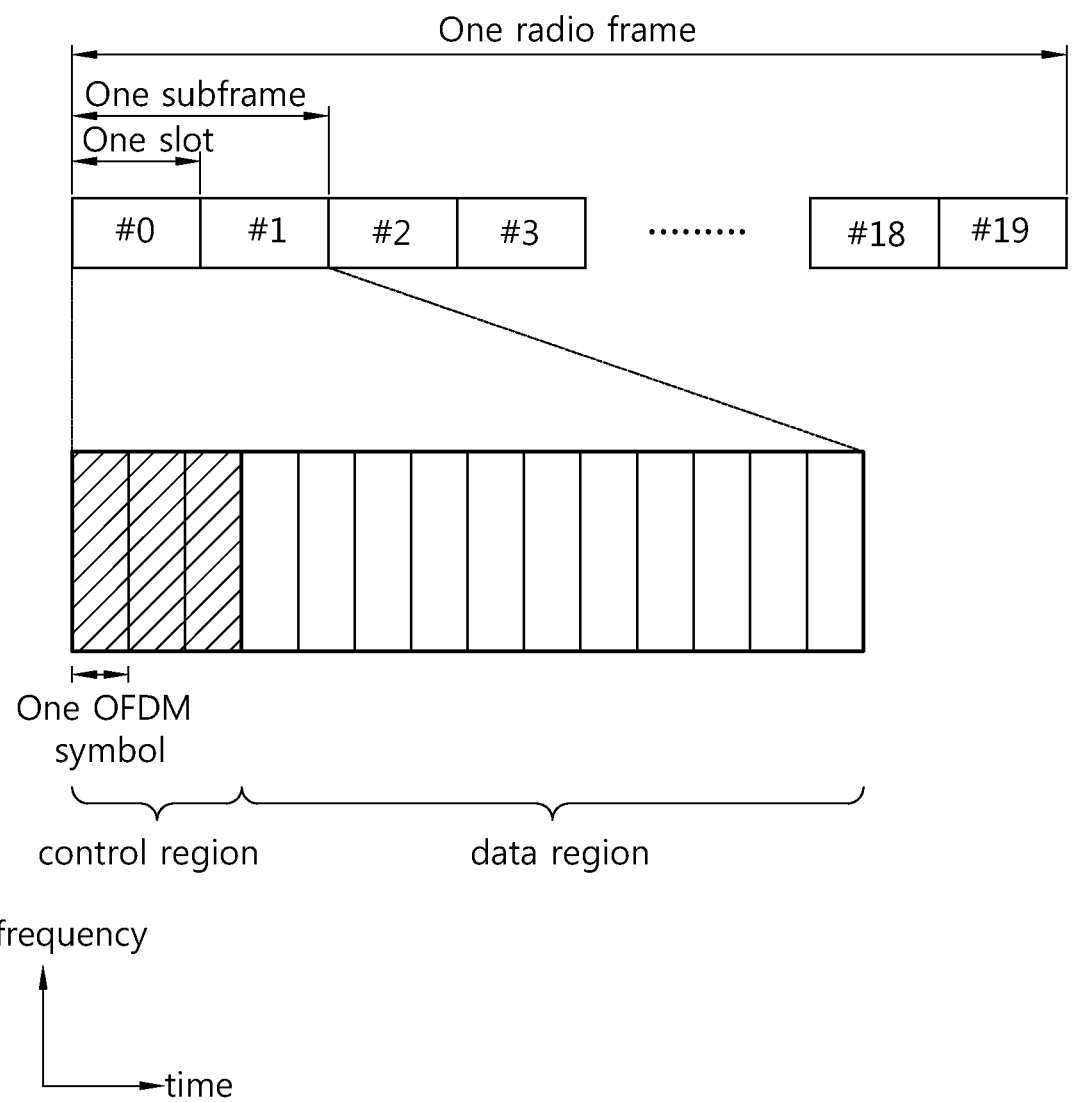
FIG. 1 shows a structure of a downlink (DL) radio frame in $3^{rd}$ generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7 12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
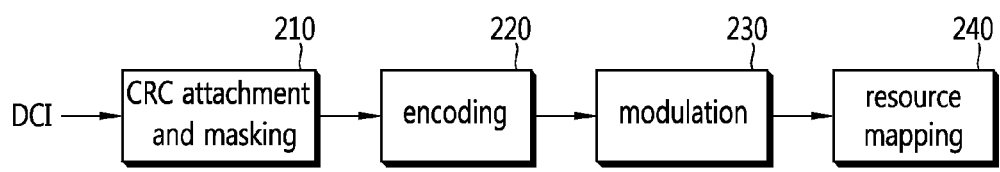
FIG. 2 is a block diagram showing a structure of a physical downlink control channel (PDCCH).

FIG. 2 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
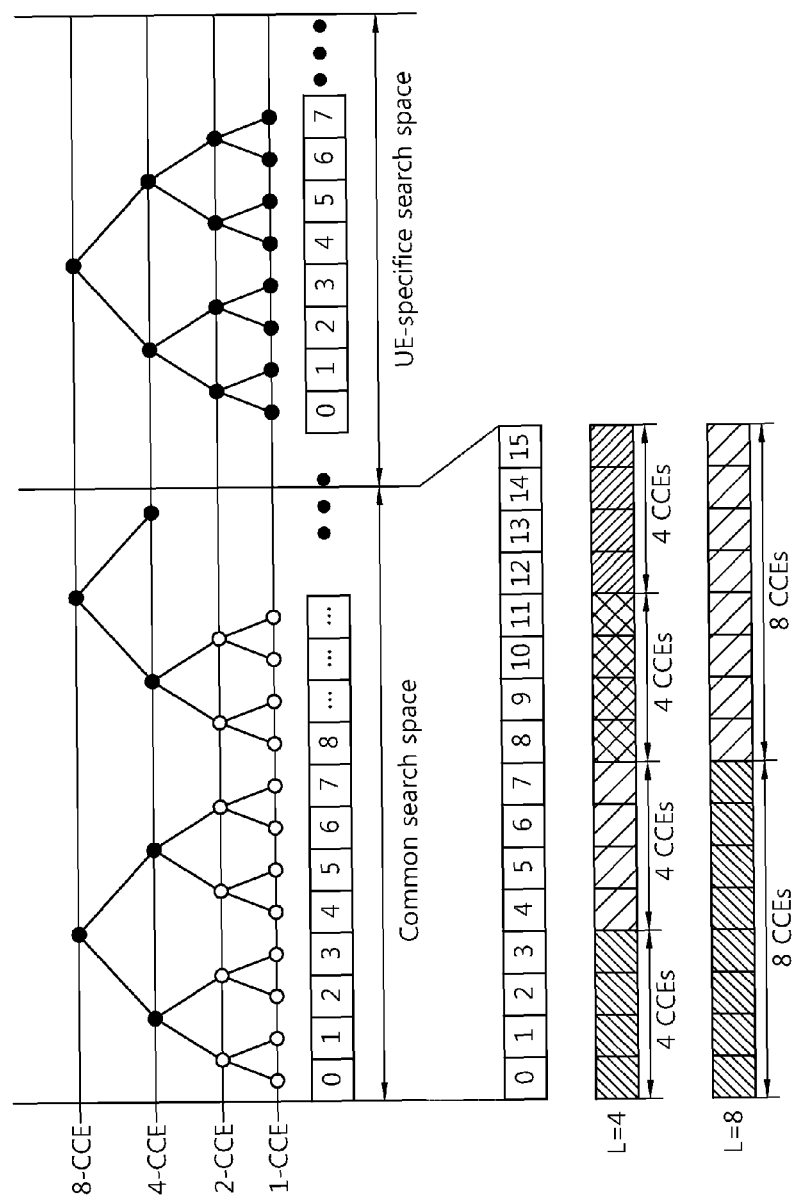
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level Le {1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \quad \text{[Equation 1]}$$

Herein, i=0,1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1} = n_{RNTI} \neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single-antenna port, port 0 |
|  | DCI format 1 | UE specific | Single-antenna port, port 0 |
| Mode 2 | DCI format 1A | common and UE specific | Transmit diversity |
|  | DCI format 1 | UE specific | Transmit diversity |
| Mode 3 | DCI format 1A | common and UE specific | Transmit diversity |
|  | DCI format 2A | UE specific | CDD(Cyclic Delay Diversity) or Transmit diversity |
| Mode 4 | DCI format 1A | common and UE specific | Transmit diversity |
|  | DCI format 2 | UE specific | Closed-loop spatial multiplexing |
| Mode 5 | DCI format 1A | common and UE specific | Transmit diversity |
|  | DCI format 1D | UE specific | MU-MIMO(Multi-User Multiple Input Multiple Output) |
| Mode 6 | DCI format 1A | common and UE specific | Transmit diversity |
|  | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
|  | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
|  | DCI format 2B | UE specific | Dual layer transmission (port 7 or 8), or a single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |

TABLE 3-continued

| DCI format | Contents |
|---|---|
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Figure 4:
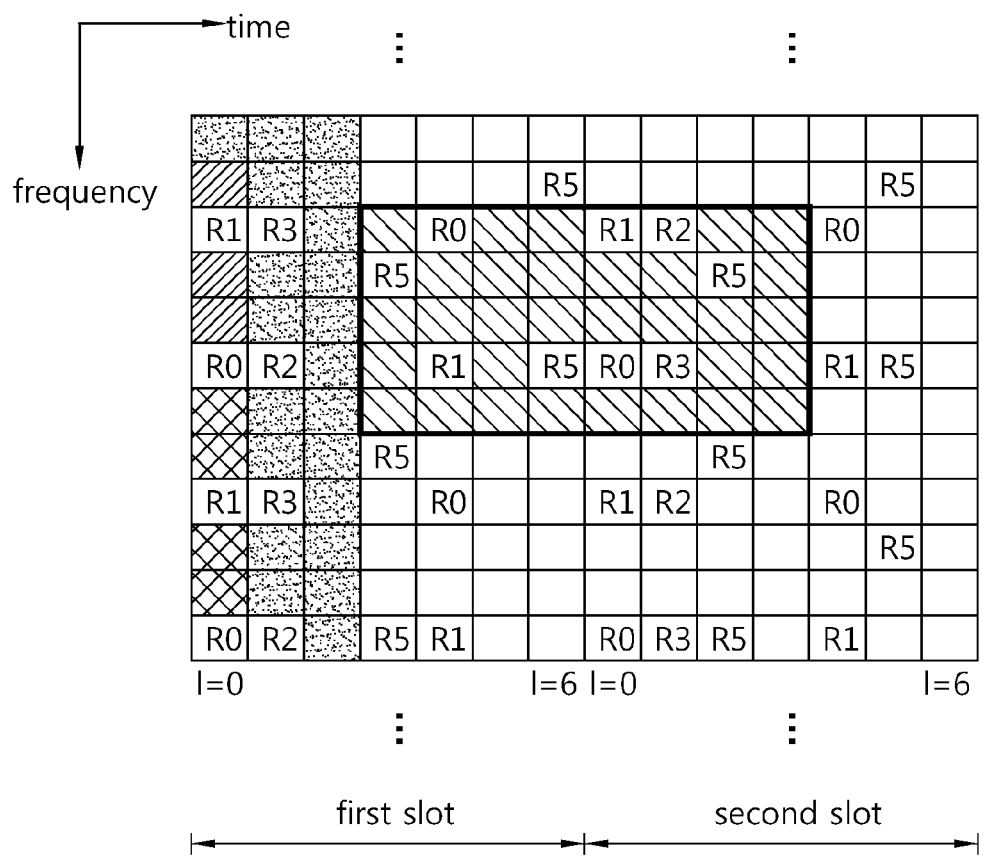
FIG. 4 shows an example of arranging a reference signal and a control channel in a DL subframe of 3GPP LTE.

FIG. 4 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,n_s}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, m=0,1, . . . , $2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n) = (x_1(n+Nc) + x_2(n+Nc)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 4]}$$

Herein, Nc=1600, and a first m-sequence is initialized as $x_1(0)=1$, $x_1(n)=0$, m=1,2, . . . , 30.

A second m-sequence is initialized as $c_{init}=2^{10}(7(ns+1)+1+1)(2N^{cell}_{ID}+1)+2 N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, $m=0,1,\ldots,12N_{PDSCH,RB}-1$, and $N_{PDSCH,RB}$ is the number of RBs used for transmission of a corresponding PDSCH. A pseudo-random sequence generator is initialized as $c_{init}=$ (floor(ns/2)+1)(2$N^{cell}_{ID}$+1)$2^{16}$+$n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=$ (floor(ns/2)+1)(2 $N^{cell}_{ID}$ 1)$2^{16}$+$n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 5:
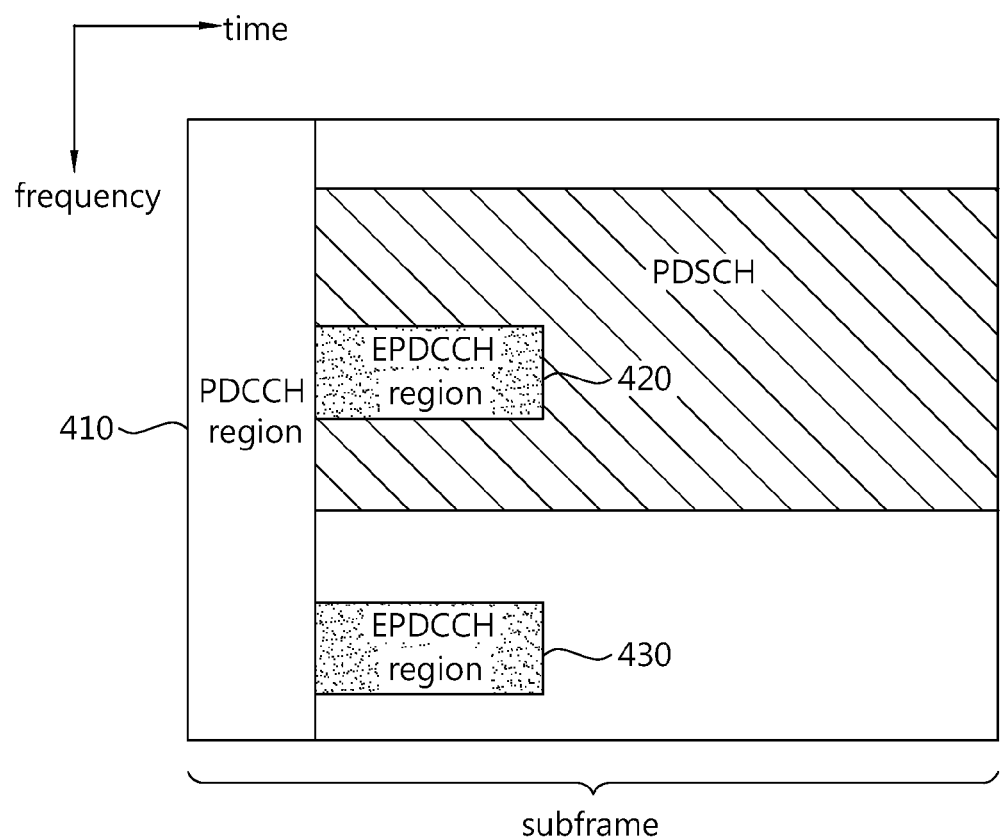
FIG. 5 shows an example of a subframe having an enhanced PDCCH (EPDCCH).

FIG. 5 is an example of a subframe having an EPDCCH.

The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, $m=0, 1, \ldots, 12N_{RB}-1$, and $N_{RB}$ is a maximum number of RBs. A pseudo-random sequence generator may be initialized as $c_{init}=$(floor(ns/2)+1)(2 $N_{EPDCCH,SCID}$+1)$2^{16}$+$n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

An EPDCCH search space may corresponds to an EPDCCH region. One or more EPDCCH candidates may be monitored at one or more aggregation levels in the EPDCCH search space.

Now, resource allocation for an EPDCCH will be described.

The EPDCCH is transmitted by using one or more ECCEs. The ECCE includes a plurality of enhanced resource element groups (EREGs). According to a CP and a subframe type based on a time division duplex (TDD) DL-UL configuration, the ECCE may include 4 EREGs or 8 EREGs. For example, the ECCE may include 4 EREGs in a normal CP case, and may include 8 EREGs in an extended CP case.

A physical resource block (PRB) pair is 2 PRBs having the same RB number in one subframe. The PRB pair is a first PRB of a first slot and a second PRB of a second slot in the same frequency domain. In the normal CP case, the PRB pair includes 12 subcarriers and 14 OFDM symbols, and thus includes 168 resource elements (REs).

Figure 6:
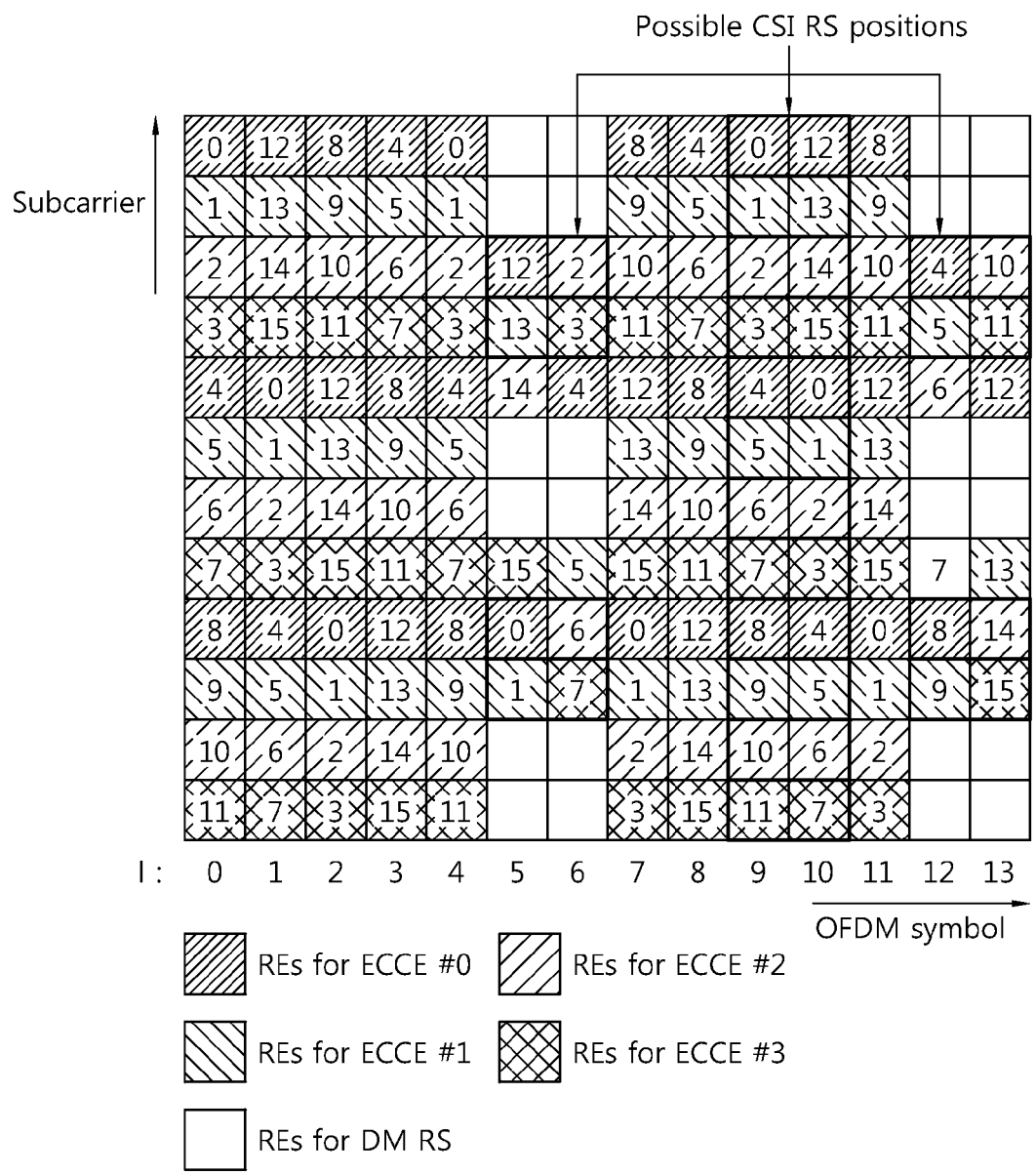
FIG. 6 shows an example of a physical resource block (PRB) pair.

FIG. 6 shows an example of a PRB pair. Although it is assumed hereinafter that a subframe includes 2 slots and a PRB pair in one slot includes 7 OFDM symbols and 12 subcarriers, the number of OFDM symbols and the number of subcarriers are for exemplary purposes only.

In one subframe, the PRB pair includes 168 REs in total. 16 EREGs are configured from 144 REs, except for 24 REs for a DM RS. Therefore, 1 EREG may include 9 REs. However, a CRS-RS or a CRS may be placed to one PRB pair, in addition to the DM RS. In this case, the number of available REs may be decreased, and the number of REs included in 1 EREG may be decreased. The number of REs included in the EREG may be changed, whereas there is no change in the number (i.e., 16) of EREGs included in one PRB pair.

In this case, as shown in FIG. 6, an RE index may be assigned sequentially starting from a first subcarrier of a first OFDM symbol (l=0). Assume that 16 EREGs are indexed from 0 to 15. In this case, 9 REs having an RE index 0 are assigned to an EREG 0. Likewise, 9 REs corresponding to an RE index k (k=0, . . . , 15) are assigned to an EREG k.

An EREG group is defined by aggregating a plurality of EREGs. For example, if an EREG group having 4 EREGs is defined, it may be defined as an EREG group #0={EREG 0, EREG 4, EREG 8, EREG 12}, an EREG group #1={EREG 1, EREG 5, EREG 9, EREG 3}, an EREG group #2={EREG 2, EREG 6, EREG 10, EREG 14}, and an EREG group #3={EREG 3, EREG 7, EREG 11, EREG 15}. If an EREG group having 8 EREGs is defined, it may be defined as an EREG group #0={EREG 0, EREG 2, EREG 4, EREG 6, EREG 8, EREG 10, EREG 12, EREG 14} and an EREG group #1={EREG 1, EREG 3, EREG 5, EREG 7, EREG 9, EREG 11, EREG 13, EREG 15}.

As described above, the ECCE may include 4 EREGs. In an extended CP case, the ECCE may include 8 EREGs. The ECCE is defined by the EREG group. For example, it is exemplified in FIG. 6 that an ECCE #0 includes an EREG group #0, an ECCE #1 includes an EREG group #1, an ECCE #2 includes an EREG group #2, and an ECCE #3 includes an EREG group #3.

ECCE-to-EREG mapping has two types of transmission, i.e., localized transmission and distributed transmission. In the localized transmission, an EREG group constituting one ECCE is selected from EREGs of one PRB pair. In the distributed transmission, an EREG constituting one ECCE is selected from EREGs of different PRB pairs.

Since the number of REs belonging to the EREG may be changed as described above, the number of REs constituting the ECCE may differ for each ECCE. For example, a CSI-RS may be transmitted in OFDM symbols with l=9, 10, and thus 2 REs are excluded in a certain ECCE, whereas 1 RE is excluded in another ECCE. As a result, the number of REs may be inconsistent between ECCEs. To reduce the inconsistency in the number of REs assigned to the ECCE, a cyclic shift of an RE index is taken into account.

Figure 7:
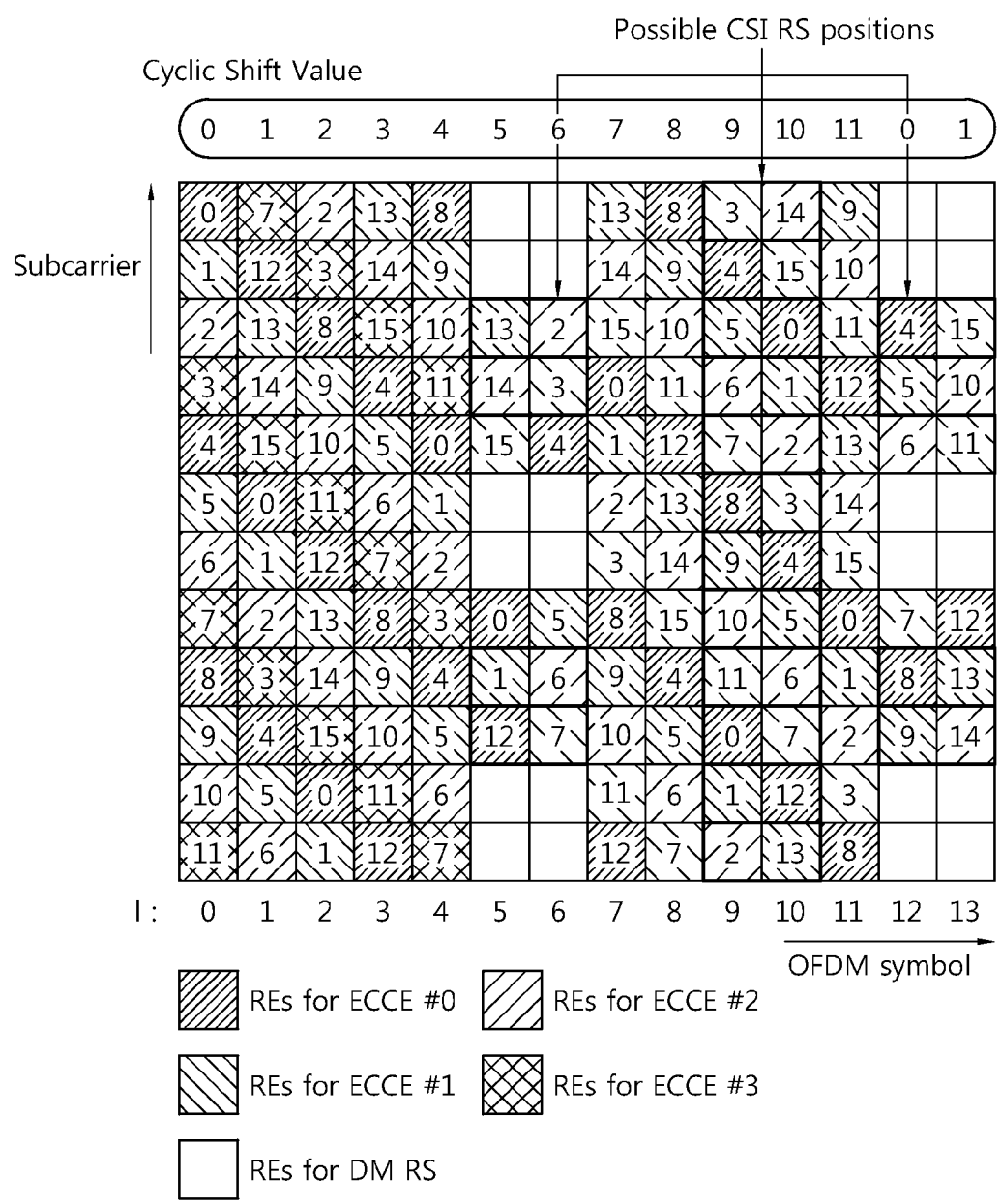
FIG. 7 shows an example of a PRB pair to which a cyclic shift is applied.

FIG. 7 shows an example of a PRB pair to which a cyclic shift is applied.

In an RE index arrangement of FIG. 7, an index of REs belonging to the same OFDM symbol is shifted by a cyclic shift value. For example, an RE index is cyclically shifted by 1 from an OFDM symbol with an index l=1, and an RE index is cyclically shifted by 2 from an OFDM symbol with an index l=2. The cyclic shift value is for exemplary purposes only.

The cyclic shift value may be given based on an OFDM symbol index.

Now, a problem caused by blind decoding when DCI is mapped to an ECCE and a solution thereof will be described.

A control channel basically performs channel coding (e.g., tail bit convolution coder (TBCC)) and/or constellation mapping (e.g., binary phase shift keying (BPSK) or quadrature phase shift keying (QPSK)), and thereafter reads values stored in a buffer according to a CCE size and an aggregation level. Further, the values are mapped to physical resources (e.g., RB, RE, REG, etc.). For example, a method of configuring a coded bit according to a size of an aggregation level is for reading the aggregation level size in a circular shift manner from a buffer for storing an output value of a TBCC with a code rate ⅓.

The legacy PDCCH is constructed with only one code block since code block segmentation is not performed. Further, unlike a turbo coder used in a PDSCH, full buffer rate matching is performed without having to perform limited buffer rate matching.

There may be a case where a CCE size corresponding to an aggregation level is equal to the number of coded bits corresponding to a code rate ⅓. In this case, even if a high aggregation level is used, decoding may be performed at a low aggregation level. This may cause an ambiguity when calculating an aggregation level in use and a starting position of subsequent PDCCH candidates.

Figure 8:
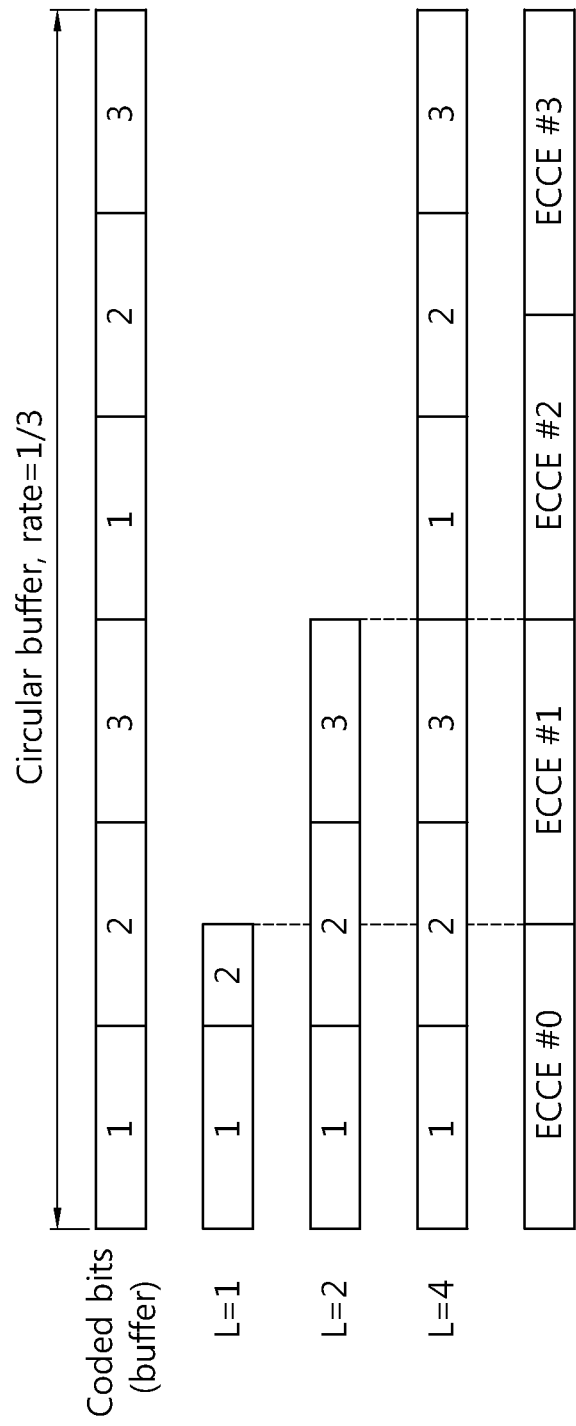
FIG. 8 shows a problem of PDCCH monitoring.

FIG. 8 shows a problem of PDCCH monitoring.

In case of an aggregation level L=1, decoding has no problem. However, an aggregation level L=2 and an aggregation level L=4 use the same code block due to a problem of a circular buffer. This implies that, even if a BS transmits a PDCCH with the aggregation level L=4, a wireless device may successfully decode the PDCCH with the aggregation level L=2.

In LTE, one bit is padded to the DCI, so that decoding is not successfully performed at an unintended aggregation level.

However, it may be difficult to solve the aforementioned problem in an EPDCCH when applying the 1-bit padding. This is because an ECCE size (e.g., the number of REs included in an ECCE) may differ for each PRB pair in the PDCCH as described above.

Although it is assumed hereinafter that a circular buffer has a code rate ⅓ and an aggregation level is L=2, this is for exemplary purposes only, and thus the present invention is not limited thereto. In addition, the number of EREGs included in the ECCE and the number of REs included in the EREG are for exemplary purposes only.

Figure 9:
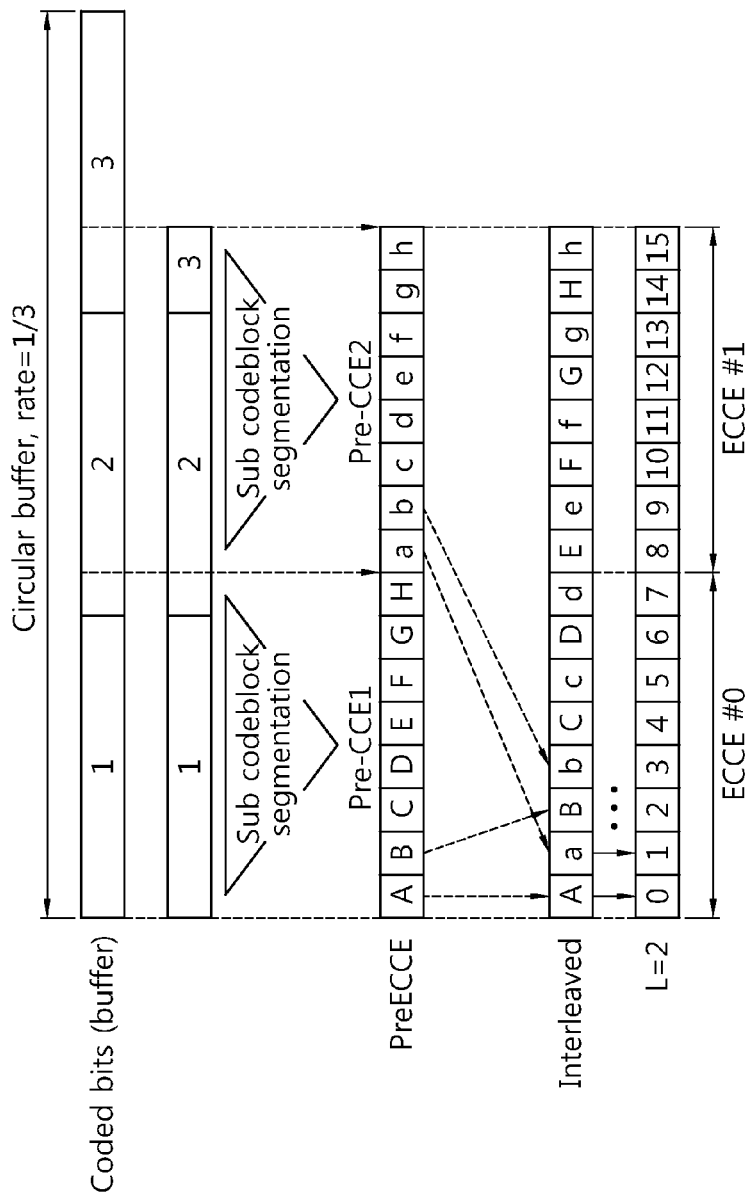
FIG. 9 shows resource mapping according to an embodiment of the present invention.

FIG. 9 shows resource mapping according to an embodiment of the present invention.

For clear understanding, it is assumed that an aggregation level is L=2, an ECCE #0 includes 8 REs indexed from 0 to 7, and an ECCE #1 includes 8 REs indexed from 8 to 15.

Since 16 REs are available in total, two code blocks are configured by respectively using 8 bits from circular buffers. Assume that a $1^{st}$ code block consists of bits A to H, and a $2^{nd}$ code block consists of bits a to h. In the legacy PDCCH, the bits are directly mapped to an RE of a CCE. However, in the present embodiment, the bits of the $1^{st}$ and $2^{nd}$ code blocks are interleaved to construct an interleaved code block. The interleaved code block is constructed of {A, a, B, b, . . . }. A bit of the interleaved code block is mapped to each RE.

Although it is exemplified herein that the interleaved code block is constructed from the bits of the $1^{st}$ and $2^{nd}$ code blocks and thereafter is mapped to the RE, the interleaving may be applied when mapping is performed on the RE from the bits of the $1^{st}$ and $2^{nd}$ code blocks.

Although the bits A to H and the bits a to h are expressed in a bit form, they may correspond to modulation symbols. For example, if BPSK is applied, the bits A to H and the bits a to h are modulation symbols. When QPSK is applied, the bits A to H and the bits a to h are modulation symbols, and 32 bits may be read from circular buffers.

Figure 10:
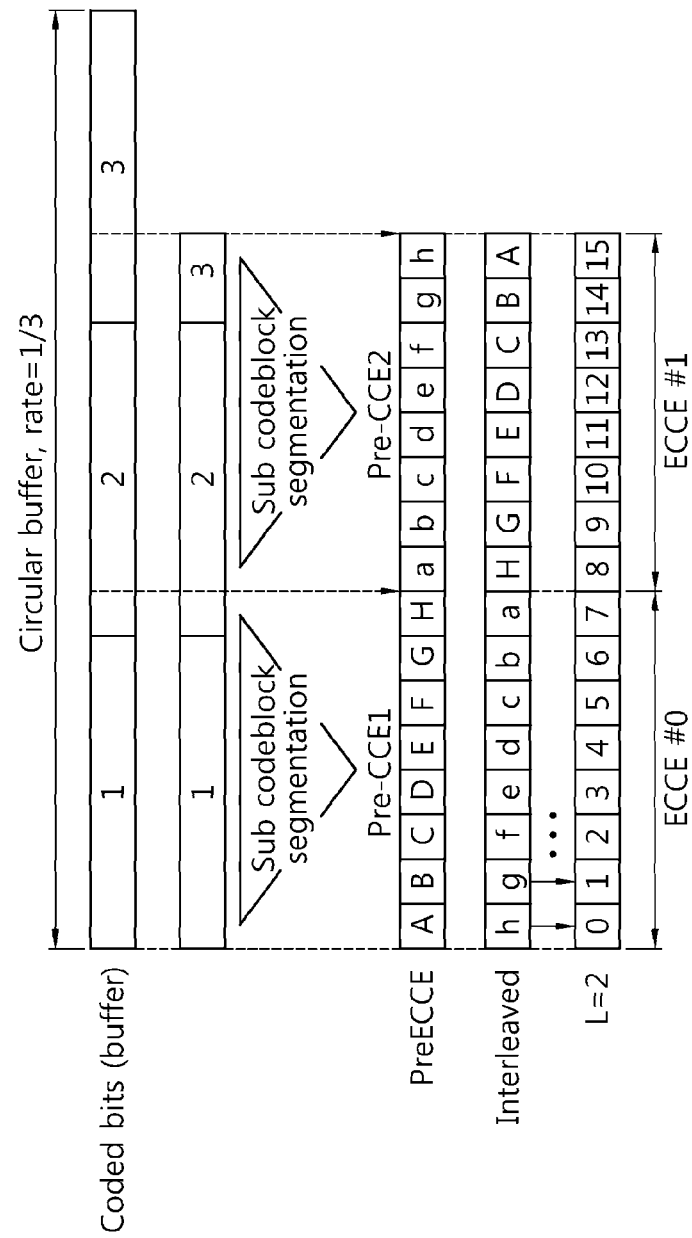
FIG. 10 shows resource mapping according to another embodiment of the present invention.

FIG. 10 shows resource mapping according to another embodiment of the present invention.

Interleaving for an interleaved code block is different from the embodiment of FIG. 9. The interleaved code block is constructed by reversely arranging bits, from the bits A to H of the $1^{st}$ code block and the bits a to h of the $2^{nd}$ code block.

Now, an example of mapping the ECCE #0 and the ECCE #1 of FIG. 9 and FIG. 10 to a physical resource (e.g., PRB) will be described.

Figure 11:
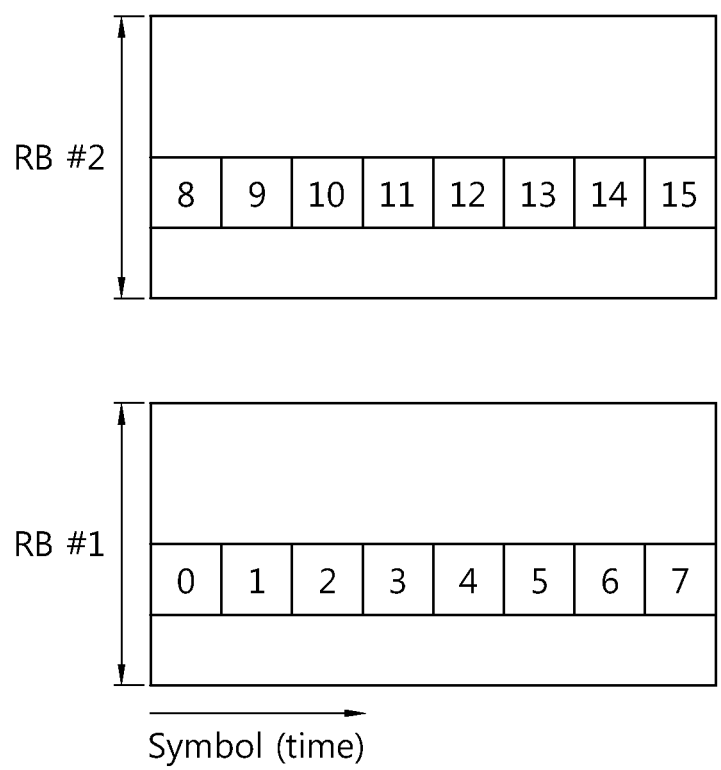
FIG. 11 shows an example of control channel element (CCE)-to-PRB mapping.

FIG. 11 shows an example of CCE-to-PRB mapping. The CCE #0 and the CCE #1 are first mapped to an OFDM symbol. This is called time-first mapping.

Figure 12:
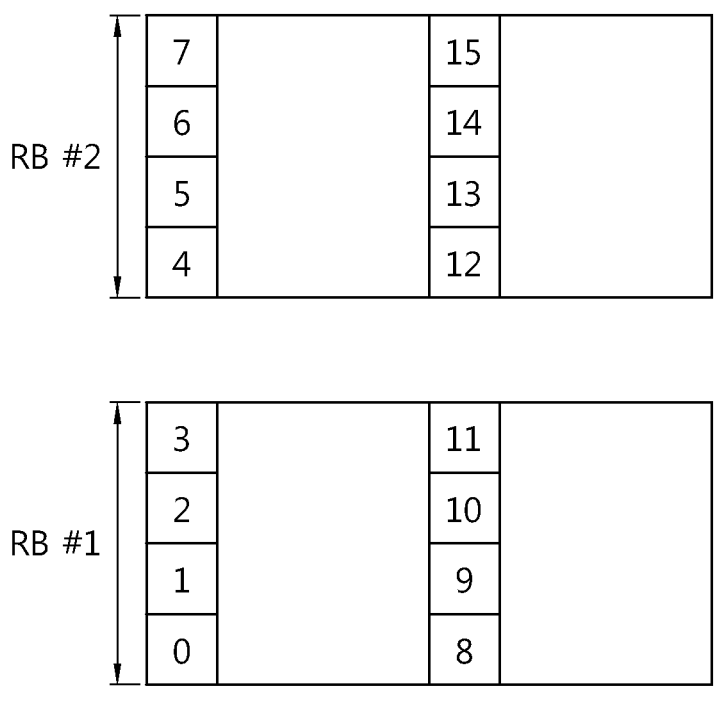

FIG. 12 shows another example of CCE-to-PRB mapping. The CCE #0 and the CCE #1 are first mapped to a subcarrier. This is called frequency-first mapping.

Figure 13:
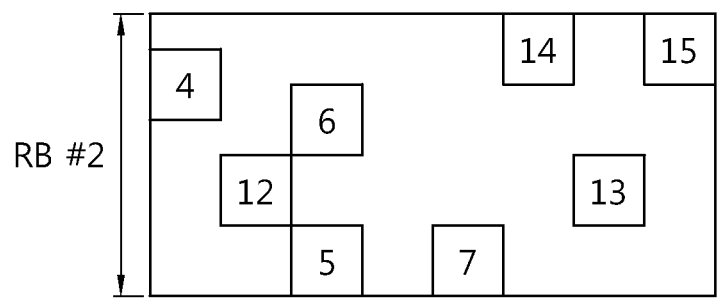
FIG. 13 shows another example of CCE-to-PRB mapping.
Figure 13:
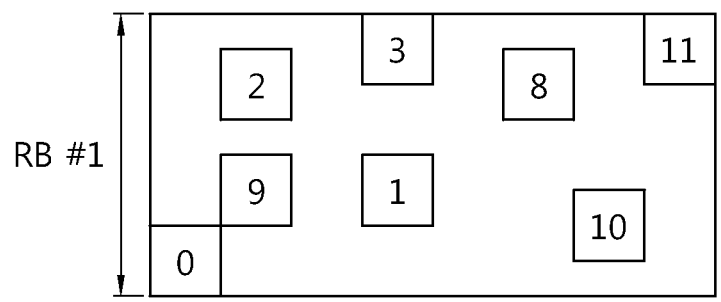

FIG. 13 shows another example of CCE-to-PRB mapping. The CCE #0 and the CCE #1 are mapped according to a designated pattern. The pattern may be predetermined or may be randomly determined.

Figure 14:
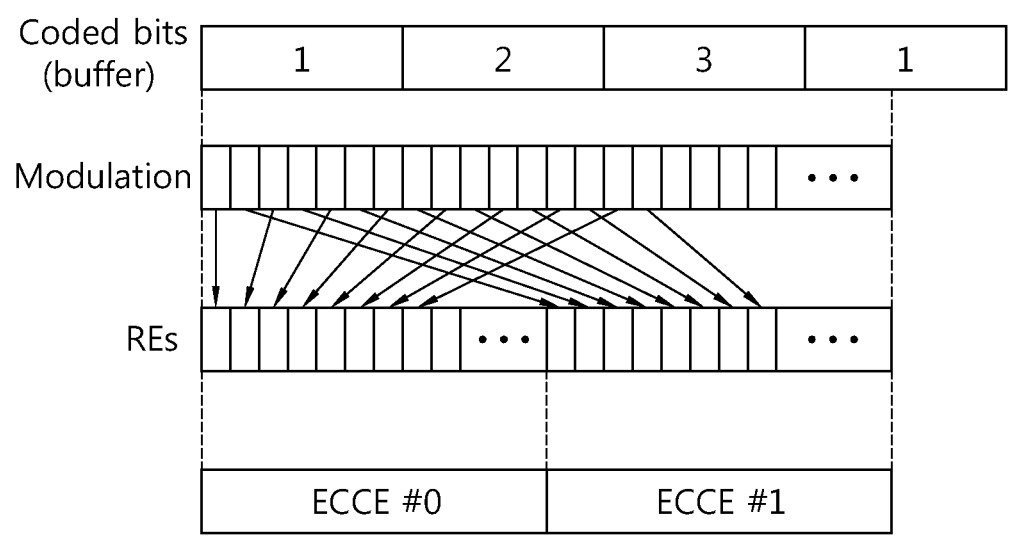
FIG. 14 shows resource mapping according to another embodiment of the present invention.

FIG. 14 shows resource mapping according to another embodiment of the present invention. This is an example of mapping a next modulation symbol (or coded bit) to an RE belonging to a next ECCE, similarly to the embodiment of FIG. 9.

Assume that one ECCE includes 4 EREGs, and one EREG includes 9 REs. If L=2, the ECCE #0 and the ECCE #1 are used, and the number of available REs is 72. Assume that RE(p,q) denotes a $q^{th}$ RE belonging to a $p^{th}$ ECCE. Herein, p=0, ..., L−1, and q=0, ..., Kp−1. L denotes a corresponding aggregation level, and Kp denotes the total number of REs belonging to an ECCE p. In the present embodiment, p=0, 1, and q=0, ..., 35.

A coded bit of DCI is mapped to generate a modulate symbol d(n), where n=0, ..., N−1. N denotes the total number of available REs at a corresponding aggregation level.

Orders of modulation symbols mapped to the ECCE #0 and the ECCE #1 are permutated. Such mapping may be called frequency-first mapping. This may be expressed by using the aforementioned symbol as follows.

$$RE(0,0)=d(0), RE(1,0)=d(1), RE(0,1)=d(2), RE(1,1)=d(3), \ldots$$

Figure 15:
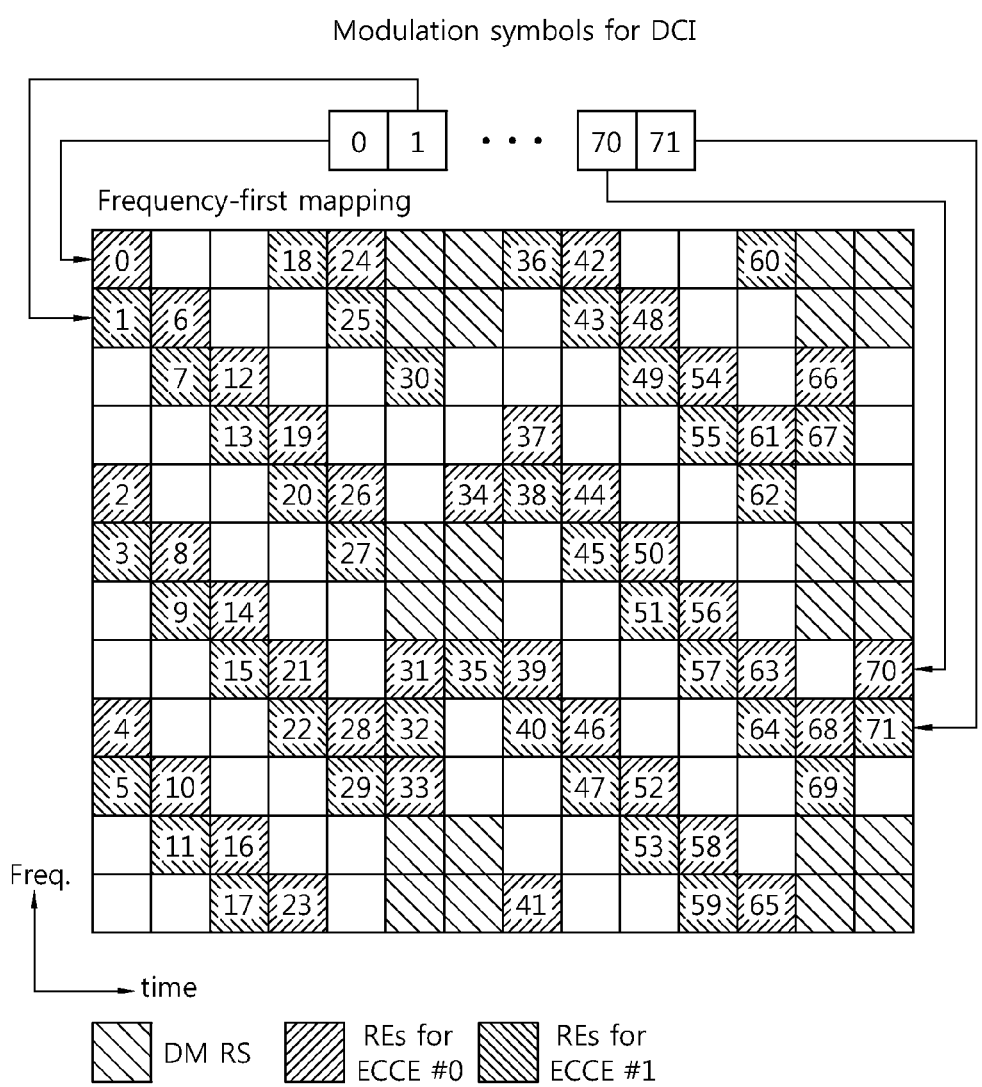
FIG. 15 shows an example of a PRB pair according to resource mapping of FIG. 14.

FIG. 15 shows an example of a PRB pair according to the resource mapping of FIG. 14.

In a case where ECCEs #0 to #3 are configured as shown in FIG. 7, it is assumed that, if L=2, the ECCE #0 and the ECCE #1 belong to an EPDDCH search space. Modulation symbols d(0), ..., d(71) are permutated and mapped to an RE belonging to the ECCE #0 and an RE belonging to the ECCE #1. A number in a box of FIG. 15 denotes n of d(n).

Although an example of mapping DCI to {ECCE #0, ECCE #1} is shown when L=2 in the above embodiment, this is for exemplary purposes only. Thus, a selected ECCE set may be various such as {ECCE #0, ECCE #2}, {ECCE #0, ECCE #3}, {ECCE #1, ECCE #2}, {ECCE #1, ECCE #3}, {ECCE #2, ECCE #3}.

The aforementioned embodiment may be applied to a higher aggregation level such as L=4, 8, 16, etc. For example, assume that L=4, and p=0, 1, 2, 3. The modulation symbol d(n) may be mapped as follows.

$$RE(0,0)=d(0), RE(1,0)=d(1), RE(2,0)=d(2), RE(3,0)=d(3), RE(0,1)=d(4), \ldots$$

The aforementioned embodiment may be further generalized such that d(n) is mapped to an RE belonging to a {(n mod L)+1}$^{th}$ ECCE. Alternatively, d(n) may be mapped to an RE belonging to an ECCE p, where p=(n mod L).

In addition, d(n) may be mapped to L ECCEs on the basis of a modulo-L. 'mode' and 'modulo' denote a modulo operation.

Although it is described that d(n) corresponds to a modulation symbol, this is for exemplary purposes only. d(n) may correspond to a bit, a bit set, and/or a set of modulation symbols.

Although a specific term 'ECCE' and 'RE' is used as a radio resource used in an EPDCCH, this is for exemplary purposes only. The ECCE is a resource unit constituting an aggregation level, and may be expressed in various terms such as a basic unit constituting the resource unit.

Meanwhile, an EREG indexing method is an issue related to the proposed invention.

An EREG may be constructed with a PRB pair or one or more REs scattered in a PRB group. This is because EREG indexing constructed in this manner may have a direct effect on EPDCCH mapping. If an index is given in a frequency-first order (see FIG. 6), there is no ambiguity when mapping is performed in that order. However, the meaning of 'frequency-first' requires to determine a specific RE on the basis of which EREG indexing is performed among REs constituting the EREG.

For example, when an RE position is designated to a sub-carrier index k and an OFDM symbol index l, an index order is small in an EREG including an RE of which (k+1) is smallest. Alternatively, an index order is small in an EREG including an RE of which k is small. Alternatively, an index order is small in an EREG including an RE of which l is small.

The ambiguity may be solved when the frequency-first mapping is performed on the basis of an EREG index determined by the aforementioned criterion.

Alternatively, the EREG mapping may perform time-first mapping. An RE, an EREG, and an ECCE may be subjected to RE mapping in different directions. The RE mapping may perform time-first mapping (or frequency-first mapping), and the EREG mapping may perform frequency-first mapping (or time-first mapping).

Alternatively, as to RE mapping, EREG mapping, and ECCE mapping, mapping in which hopping is made according to a designated pattern may be performed, instead of performing mapping sequentially in an index order.

Although the proposed method above cannot completely solve a problem in which decoding is successful at a wrong aggregation level by using only resource mapping, bit padding may be additionally used. For example, since the number of source bits is identical between DCI formats, a padding bit may be appended to distinguish the DCI formats.

Figure 16:
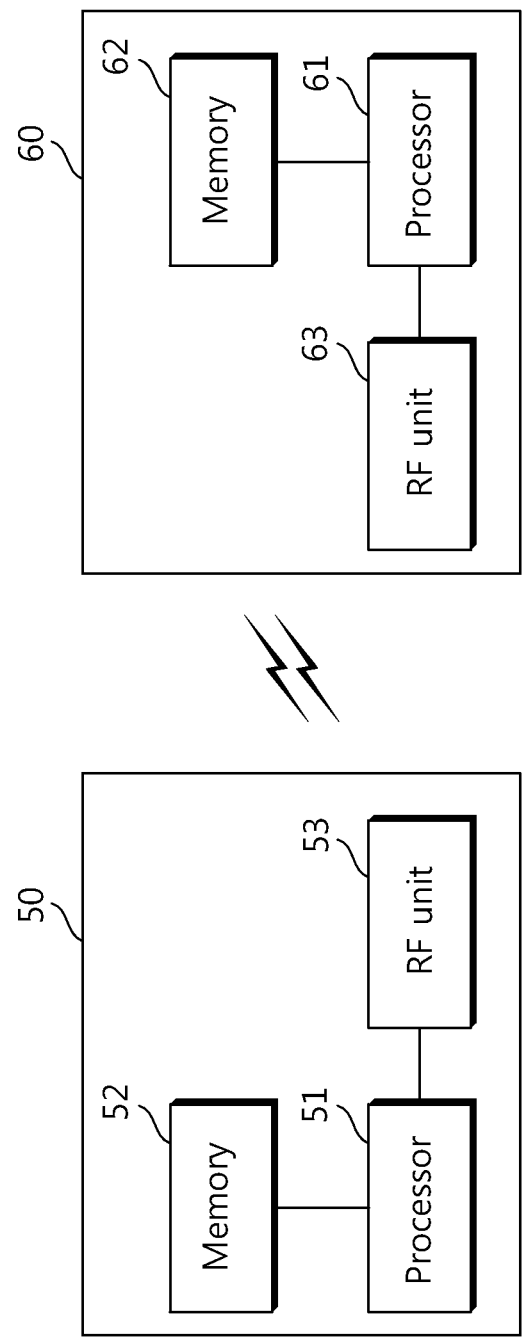
FIG. 16 is a block diagram showing a wireless communication system according to an embodiment of the present invention.

FIG. 16 is a block diagram showing a wireless communication system according to an embodiment of the present invention.

ABS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS can be implemented by the processor 51. The processor 51 can configure an EPDCCH search space in one or more PRB pairs, and can transmit an EPDCCH.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device can be implemented by the processor 60. The processor 61 can monitor an EPDCCH in an EPDCCH search space.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for monitoring a downlink control channel in a wireless communication system, the method comprising:
    monitoring, by a wireless device, an enhanced physical control channel (EPDCCH) in an EPDCCH search space of a subframe,
    wherein the EPDCCH search space includes a physical resource block (PRB)-pair of the subframe, the PRB pair including a plurality of resource elements (REs), each of the plurality of REs being defined by a subcarrier index and orthogonal frequency division multiplexing (OFDM) symbol index,
    wherein the plurality of REs except REs used for a demodulation reference signal are cyclically indexed from 0 to 15 with an increasing order of first the subcarrier index and then the OFDM symbol index in the PRB-pair,
    wherein 16 enhanced resource element groups (EREGs) used for defining the EPDCCH are indexed from 0 to 15 such that an EREG with an index k among the indexes from 1 to 15 includes all REs with the same index k in the PRB-pair.

2. The method of claim 1, wherein the demodulation reference signal is used to demodulate the EPDCCH.

3. The method of claim 1, wherein the EPDCCH search space includes a plurality of PRB-pairs of the subframe and there are 16 EREGs per PRB-pair.

4. The method of claim 1, wherein the PRB-pair includes two PRBs with same resource block number in the subframe.

5. A device for monitoring a downlink control channel in a wireless communication system, the device comprising:
    a transceiver configured to transmit and receive a radio signal; and
    a processor operatively coupled to the transceiver and configured to monitor an enhanced physical control channel (EPDCCH) in an EPDCCH search space of a subframe,
    wherein the EPDCCH search space includes a physical resource block (PRB)-pair of the subframe, the PRB pair including a plurality of resource elements (REs), each of the plurality of REs being defined by a subcarrier index and orthogonal frequency division multiplexing (OFDM) symbol index,
    wherein the plurality of REs except REs used for a demodulation reference signal are cyclically indexed from 0 to 15 with an increasing order of first the subcarrier index and then the OFDM symbol index in the PRB-pair,
    wherein 16 enhanced resource element groups (EREGs) used for defining the EPDCCH are indexed from 0 to 15 such that an EREG with an index k among the indexes from 1 to 15 includes all REs with the same index k in the PRB-pair.

6. The device of claim 5, wherein the demodulation reference signal is used to demodulate the EPDCCH.

7. The device of claim 5, wherein the EPDCCH search space includes a plurality of PRB-pairs of the subframe and there are 16 EREGs per PRB-pair.

8. The device of claim 5, wherein the PRB-pair includes two PRBs with same resource block number in the subframe.

* * * * *